United States Patent [19]

Beckman

[11] 4,141,951
[45] Feb. 27, 1979

[54] METHOD OF FORMING A PROTECTIVE COVERING ABOUT A THERMOMETER

[76] Inventor: Paul Beckman, 944 Henrietta Ave., Huntingdon Valley, Pa. 19006

[21] Appl. No.: 826,473

[22] Filed: Aug. 22, 1977

Related U.S. Application Data

[62] Division of Ser. No. 620,586, Oct. 8, 1975, Pat. No. 4,044,614.

[51] Int. Cl.² .................... B29C 13/00; G01K 1/08; B29F 3/00
[52] U.S. Cl. .................... 264/230; 264/250; 264/255; 264/271; 264/301; 264/342 R
[58] Field of Search ............. 264/129, 176 R, 219, 264/221, 225, 317, 259, 271, 301, 305, 149; 73/362.8, 371, 372, 374

[56] References Cited

U.S. PATENT DOCUMENTS

| 2,677,965 | 5/1954 | Saffir | 73/372 |
| 2,969,141 | 1/1961 | Katzin | 73/371 |
| 3,809,229 | 5/1974 | Wahlig | 73/371 |

Primary Examiner—Willard E. Hoag
Attorney, Agent, or Firm—Maleson, Rosenberg & Bilker

[57] ABSTRACT

Method of covering a thermometer which includes forming a total enclosure composed of a pair of coatings covering the stem portion and the bulb portion of the thermometer. A substantially transparent plastic material covering the stem portion of the improved thermometer has an index of refraction which is sufficiently high to allow a user to visually interpret the location of an internally contained heat expandable substance in relation to indicia formed on the stem portion. The bulb section of the improved thermometer is enclosed by a thermally conductive layer. Both layers are joined to form a total enclosure for the thermometer throughout the extended length of both the bulb and the stem portions. Additionally, an increased amount of substantially transparent plastic material is added to the terminal end of the stem portion of the improved thermometer in order to provide a cushioning effect under dynamic loads when the thermometer inadvertently falls to an external surface.

15 Claims, 8 Drawing Figures

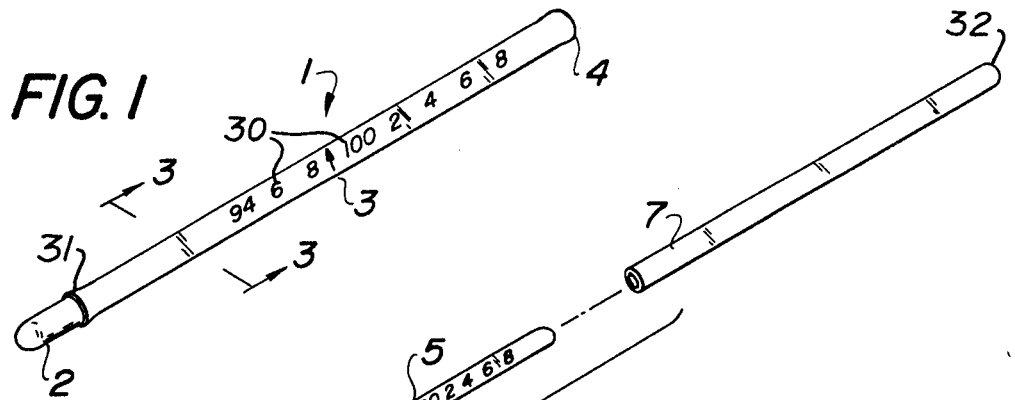
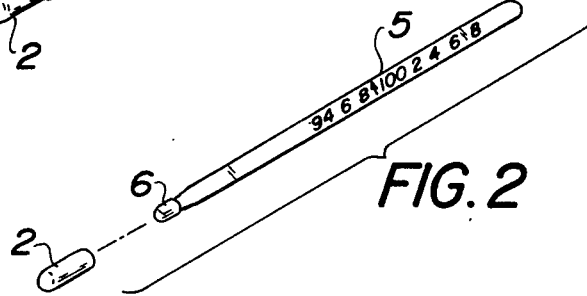
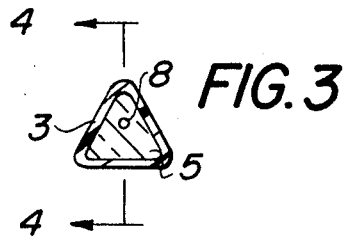
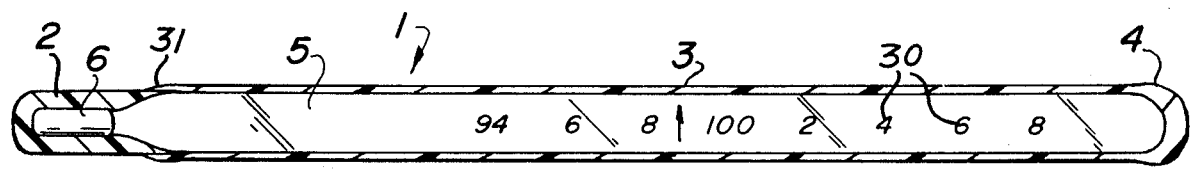
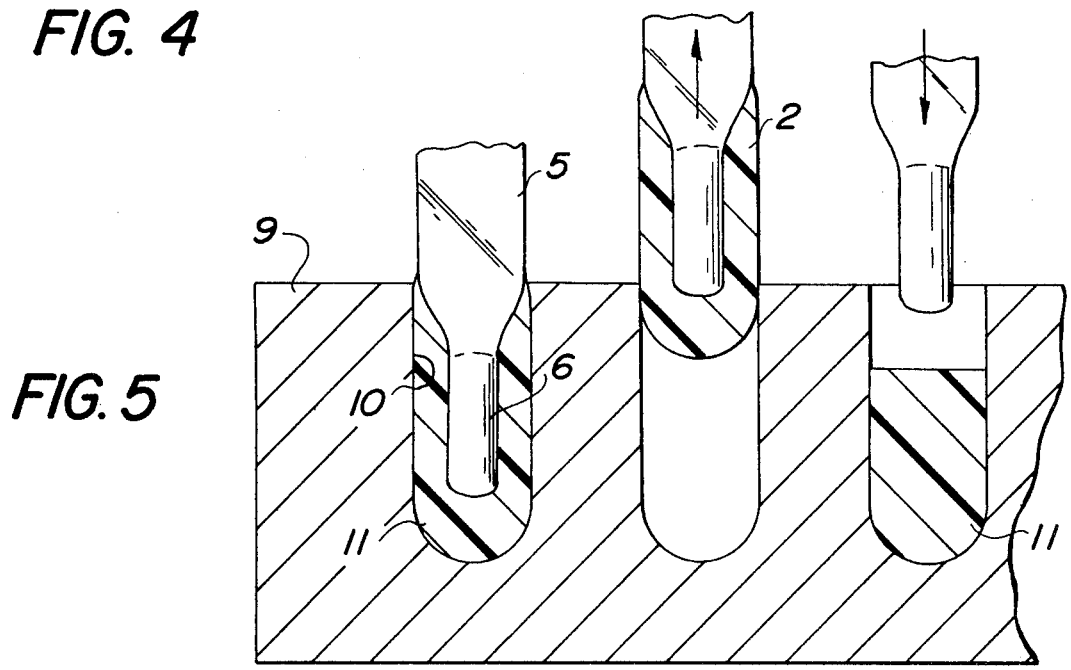

METHOD OF FORMING A PROTECTIVE COVERING ABOUT A THERMOMETER

This is a division of application Ser. No. 620,586, filed Oct. 8, 1975 and now U.S. Pat. No. 4,044,614.

BACKGROUND OF THE INVENTION

1. Field of the Invention

This invention pertains to heat transfer devices. In particular, this invention relates to thermometers. More in particular, this invention pertains to thermometers which are inserted into a body cavity of a user. Still further, this invention relates to reducing the effects of static and dynamic loads applied to thermometers when in use, while at the same time maintaining a short time interval for temperature read out. More in particular, this invention relates to thermometers having two coatings or layers placed over the bulb portion and the stem portion of a standard thermometer respectively.

2. Prior Art

Thermometers inserted into body cavities for measuring the temperature are known in the art. However, in some prior thermometer systems, the stem portion of the thermometers are made of glass. Glass is generally brittle in nature and has been found to be very poor in absorbing dynamic loads. Thus, when such glass thermometers have fallen to an external surface, they have been generally found to break. Such breakage has increased the cost of using such prior thermometer systems.

Additionally, such prior glass thermometer systems have been found in some cases to break when inserted rectally into a small child whose stationery position cannot be assured during the taking of the temperature. In some such cases, it has been found that the thermometer has shattered leaving splinters internal to the body cavity. This has caused a safety hazard to arise when using such prior thermometer systems.

In some prior glass thermometer systems, when the thermometer is inadvertently dropped, the glass has been found to shatter when it strikes an external surface. This has lead to splinter elements of glass being dispersed over a wide area. Such has proved to be a safety hazard in the event that splinters of glass may in some cases be found to impregnate the skin of a person.

In some prior thermometer systems, a plastic coating has been applied to the entire thermometer area including the bulb and stem portion. However, due to the low thermal conductivity of the plastic coatings involved, there has been found an increased time interval in the amount of time necessary to take the temperature when such prior thermometer systems are inserted within a body cavity. This has been found to be especially disadvantageous when the temperature of a child is being taken due to the fact that the child's immobility may not be assured for any great length of time.

SUMMARY OF THE INVENTION

A thermometer having a bulb portion and a stem portion which includes a first layer enclosing the stem portion of the thermometer. The first layer has an index of refraction sufficiently high to provide visual interpretation of the positional location of an internally contained heat expandable substance in relation to indicia formed on the stem portion of the thermometer. A second thermally conductive layer encloses the bulb portion of the thermometer to provide a rapid heat transfer mechanism from the external environment of the thermometer to the heat expandable substance contained within the bulb portion of the thermometer. The first and second layers are joined to form an enclosure for the thermometer throughout the extended length of the thermometer.

BRIEF DESCRIPTION OF THE DRAWINGS

FIG. 1 is a perspective view of the improved thermometer showing both the bulb cover and the plastic stem cover;

FIG. 2 is an exploded view in perspective of the improved thermometer showing clear plastic tubing utilized in one form of the invention as a stem cover;

FIG. 3 is a sectional view of the improved thermometer taken along the section line 3—3 of FIG. 1;

FIG. 4 is a sectional view of the improved thermometer taken along the section line 4—4 of FIG. 3;

FIG. 5 is an elevational view of a mold depicting the method steps employed in coating the bulb end of the thermometer with the second layer having a thermally conductive coating;

DESCRIPTION OF THE PREFERRED EMBODIMENTS

Figure 6:
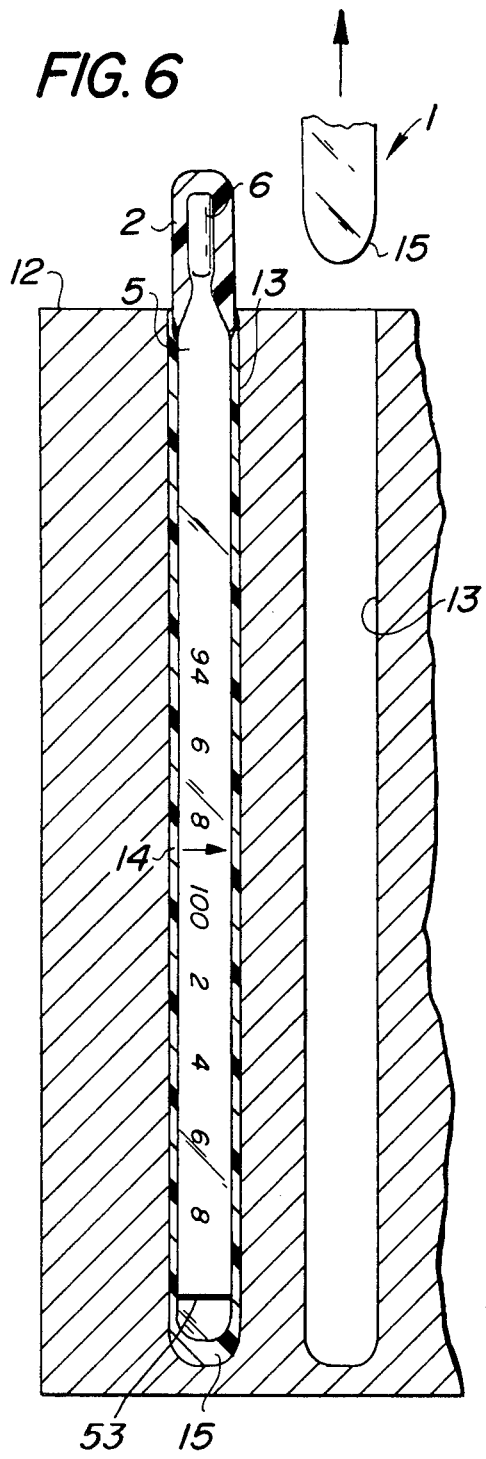
FIG. 6 is an elevational view of a dip mold depicting the method steps involved in dip molding the first layer over the stem portion of the thermometer.

Referring now to FIGS. 1, 3 and 4 there is shown improved thermometer 1 comprising standard bulb portion 6 and stem portion 5. Thermometer 1 may be of the glass type either rectal or oral and having a heat expandable substance contained in thermometer bore 8. In general, the heat expandable substance, which may be mercury, is contained in or in the neighborhood of bulb 6 and expands in a generally linear fashion within bore 8 when heat is applied in the vicinity of thermometer bulb portion 6. The heat expandable substance, under heated conditions, expands within bore 8 to provide a visual interpretation of the positional location of the expanding substance in relation to indicia 30 formed on stem portion 5 of thermometer 1.

In overall concept, improved thermometer 1 provides for a temperature reading mechanism which may be used orally or rectally and which has the advantageous properties of being able to operatively absorb greater static as well as dynamic stress loadings than prior thermometers. Additionally, it has been found, as will be detailed in following paragraphs, that even when improved thermometer 1 has been stressed to its stress limits, and glass stem portion 5 has broken, glass splinters are generally maintained internal to enclosure layers 2 and 3 to provide a shatter proof mechanism. Further, means are provided such that when improved thermometer 1 is dropped or otherwise falls to an external surface, impact is generally taken at reinforced areas having a greater resiliency than the glass portions in order to cushion the impact shock and minimize the possibility of breakage.

As will be seen, improved thermometer 1 optimizes stress loading conditions which may be applied to the thermometer when in use while at the same time minimizing the effects of heat transfer insulation to allow for a thermometer temperature read out in a minimal time interval after thermometer 1 is inserted into a body cavity of the user.

Improved thermometer 1 includes first layer or stem cover 3 which encloses stem portion 5 of thermometer 1. First layer or cover 3 is composed of a material which is substantially transparent and includes an index of refraction sufficiently high to provide visual interpretation of the positional location of an internally contained heat expandable substance in relation to indicia 30 formed on or within stem portion 5. A thermally conductive second layer or bulb cover encloses and is adhered to bulb portion 6 of improved thermometer 1. Both first and second layers 3 and 2 are joined at interface area 31 to form a total enclosure for thermometer 1 throughout the extended length of improved thermometer 1. Thus, thermometer bulb 6 as well as thermometer stem 5 are provided with a discontinuous enclosure formed of bulb cover or second layer 2 in contact with stem cover or first layer 3 generally having different and distinct optical, mechanical, and thermodynamic properties.

The discontinuous enclosure for bulb portion 6 and stem portion 5 is important in that each portion of the enclosure is chosen for specific, sometimes divergent, properties. First layer 3 has essential optical properties such as a high order of transparency in order that indicia 30 may be easily read. Additionally, first layer 3 is generally more resilient than the glass portion making up stem 5 in order that greater static as well as dynamic loads may be entertained without the breaking of stem 5 as has occurred in prior thermometers.

Further, the resiliency of first layer or stem cover 3 provides for an enclosure where even if stem portion 5 were to be subjected to sufficient stress loads which were to cause a stress failure, that the enclosure provided by layer 3 would minimize the possibility of the glass within stem portion 5 shattering and dispersing splinters of glass. In order to provide both the mechanical as well as the optical properties necessary for stem cover or first layer 3, a wide variety of standard plastic materials may be utilized in improved thermometer 1.

As an example, clear thermosetting high molecular weight polymeric compounds have been successfully used to provide for the material properties of cover 3. Such thermosetting polymers are characterized by becoming hard and infusible after being subjected heat and pressure. Additionally, clear thermoplastic polymers have also been utilized and are characterized by having the property of softening under heat and pressure and being reversible with respect to the softening property. The thermoplastics found to be applicable, may be molded in a rather simple and standard fashion and include the principal groups of vinyls, polystyrenes, polyethylene, cellulosics as well as other polyamides. Numerous plastic materials of this nature may be utilized with the basic restriction that they be transparent to allow easy reading of indicia 30. In order to provide for sufficient stress loading capabilities without becoming burdensome in handling, plastic covers 3 have been found to be useful when having a wall thickness within the approximating range of between 5.0–20.0 mils of an inch.

Bulb cover or second layer 2 provides a covering element for bulb portion 6 and does not necessitate the property of transparency as is necessary for stem cover 3. However, whereas stem cover 3 is composed of plastic materials generally having a low thermal conductivity, one of the important properties of second layer 2 is that the thermal conductivity be as high as possible in order that the heat generated, when thermometer 1 is inserted in a body cavity, be transmitted to the heat expandable substance in a short interval of time.

One material utilized for bulb cover 2 is STYCAST 2850 KT which is a castable epoxy with a high thermal conductivity. This material is produced by Emerson and Cumings, Inc., Canton, Mass. This particular castable epoxy has a measured thermal conductivity of 30.0 (BTU) (in)/(HR) (FT$^2$)(° F.), and has been successfully utilized to maximize the expansion rate of the heat expandable substance within thermometer bore 8. Additionally, other plastic materials have been utilized which are impregnated with a high thermal conductivity powder. Such plastic materials include powders composed of particulates of silver, gold, aluminum, as well as copper. Additionally opaque thermally conductive silicone rubber has been successfully used for cover member 2. The resiliency of the silicone rubber provides excellent shock resistant properties and has been found to serve as a closed receptacle for the mercury when bulb 6 is finally stressed to its breaking point.

In this manner, there is provided an improved thermometer 1 which includes a two part enclosure for bulb portion 6 and thermometer stem 5 respectively. Each section of enclosure 2 and 3 provide for the necessary mechanical as well as optical properties necessary for that portion of improved thermometer 1 which it encloses.

Stem cover or first layer 3 further includes terminal closed end section or extended plastic end for mating with a terminal end of stem portion 5 when stem 5 is positionally located within first layer 3. As can be clearly seen in FIG. 4 extended plastic end 4 has a greater wall thickness than that provided for the portion of first layer 3 which is in contiguous contact with thermometer stem 5 throughout the rest of the extended length of stem portion 5. Terminal closed end section 4 of first layer 3 may include a bulbous contour or some other type of geometrical variation which would permit an increased wall thickness at the terminal end of improved thermometer 1. Extended plastic end 4 of layer 3 is provided due to the fact that it has been found through empirical experimentation that a great majority of impact loadings occur on the terminal end of improved thermometer 1.

In one form of the invention, as is clearly shown in FIG. 2, first layer or stem cover 3 is formed of clear plastic tubing 7. Clear tubing 7 includes tubing closed end 32 and provides for tubing 7 to be inserted over thermometer stem portion 5. Clear tubing 7 includes an internal dimension opening which is adapted to receive stem portion 5 of improved thermometer 1. In this form of the invention, clear tubing 7 may be formed of a clear heat shrinkable plastic, well known in the art. In this manner, it has been found that tubing 7 may be easily inserted over thermometer stem portion 5 and then heated to permit shrinkage of tubing 7 over stem portion 5. Use of such tubing has been found advantageous when the cross section of stem portion 5 of thermometer 1 is not generally circular. In many forms of construction, thermometers 1 are in a generally triangular cross section area as is shown in FIG. 3, and the use of the heat shrinkable tubing has been found to be useful in that such heat shrinkable plastics generally conform to the contour of the outer periphery of stem portions 5.

In another form of the invention clear tubing 7 may include a through opening passing throughout its extended length. After insertion of stem 5 within the through opening, tubing 7 may be plugged or otherwise closed through heat treatment or some like technique at the terminal end of stem portion 5.

In another form of the invention, improved thermometer 1 may also include a stress riser which is formed on a portion of thermometer stem 5 which is generally external to the body cavity when improved thermometer 1 is in use. Such a stress riser may be in the form of a notched area 53 shown in FIG. 6 passing around the periphery of the stem portion 5 of thermometer 1 in the neighborhood of tubular element end 32. Thus, with a stress riser present and thermometer 1 being inserted into a body cavity, a resultant stress load sufficient to break thermometer 1, would cause cracking or breakage in a section which would not be detrimental to the health of the user.

In order to provide a smooth or more planar interface area 31 where layers 2 and 3 are joined, layer or stem cover 3 may be tapered at the joining end section. This would have the effect of producing a more continuous contour interface area 31. In another embodiment, layer or cover 3 may be provided with a reduced outer diameter area in the section near interface area 31. Bulb cover 2 may then be fitted over the reduced outer diameter area of layer 3 and bonded thereto by a molding process or some like securing technique.

Referring now to FIGS. 5–8, there is shown various methods of producing improved thermometer 1. In overall concept, thermally conductive second layer 2 is formed over bulb portion 6 of improved thermometer 1. Stem portion 5 is enclosed within substantially transparent first layer or stem cover 3 with the first and second layers 3 and 2 being joined to form an enclosure for improved thermometer 1.

FIG. 5 shows the step of forming thermally conductive or second layer 2 by coating bulb portion 6 of improved thermometer 1 with a thermally conductive material as has hereinbefore been described. Bulb mold material 11 which may be a plastic material impregnated with a high thermal conductivity powder or a high thermal conductivity silicone rubber is intially placed in bulb mold cavity 10 of bulb mold 9. Generally, bulb mold material 11 is maintained in a substantially liquid state prior to the insertion of bulb portion 6 of improved thermometer 1. Bulb portion 6 is generally maintained within bulb mold material or second layer material for a predetermined time until the material is in a substantially hardened state and adheres to bulb portion 6. Coated bulb portion 6 is then withdrawn from bulb mold cavity 10 to provide bulb portion 6 with bulb cover or second layer 2.

In another form of the invention, the step of molding may include the step of providing a gelatin mold having a predetermined contour cavity somewhat similar to bulb mold cavity 10 shown in FIG. 5. In this form, bulb portion 6 is inserted into bulb mold material 11 contained within the gelatin mold. As is to be understood, bulb portion 6 is maintained in the gelatin mold until the mold material 11 adheres to the bulb portion 6 and hardens. Following this step, the gelatin mold outer casing is dissolved. Thus there is provided bulb cover 2 for bulb portion 6 as has hereinbefore been described.

In one form of the invention, first layer or stem cover 3 may be applied by a dip molding process as is shown in FIG. 6. In this method, stem portion 5 of improvied thermometer 1 is inserted into dip mold cavity 13 of dip mold 12. Clear plastic molding material 14 has been inserted into dip mold cavity 13 prior to the insertion of stem portion 5. Molding material 14 is displaced within mold cavity 13 to encompass stem portion 5 after insertion of improved thermometer 1 into mold cavity 13. Molding material 14 is allowed to harden prior to the removal of improved thermometer 1 from cavity 13. After insertion of stem portion 5 to the required depth within mold cavity 13, it is seen that the terminal end of stem portion 5 is provided with a larger clearance between the thermometer end and the lower cavity wall than the clearance on the peripheral boundary of stem portion 5. This permits plastic covering 15 at the terminal end of stem portion 5 to have a greater thickness of molding material 14 adhered thereto than is found on the periphery of the stem portion 5 at areas removed from the stem portion terminal end.

Figure 7:
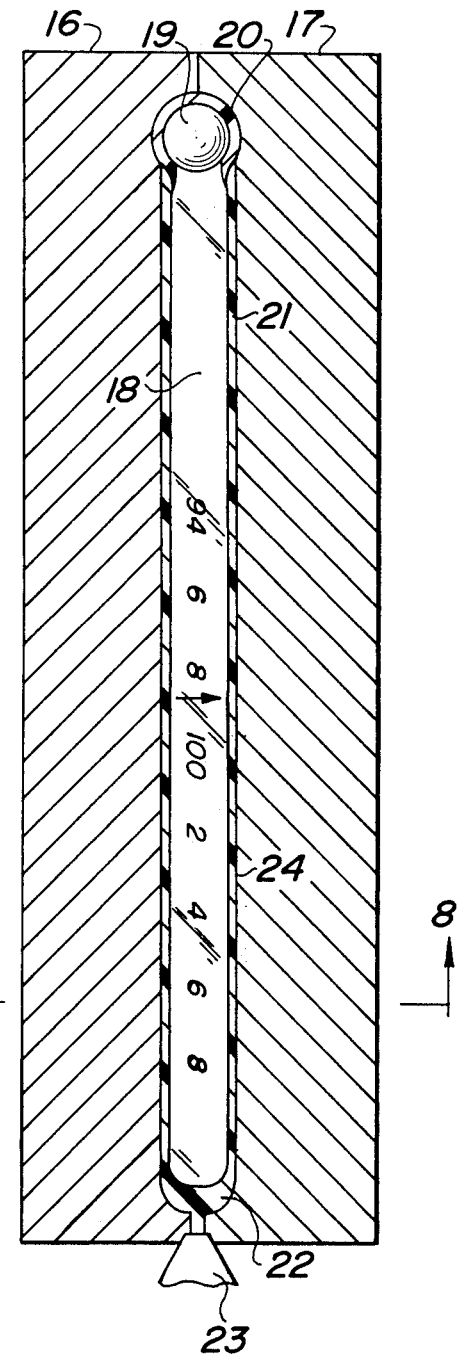
FIG. 7 is an elevational view of a mold used in an extrusion molding process to provide the enclosing first layer over the stem portion of the thermometer.
Figure 8:
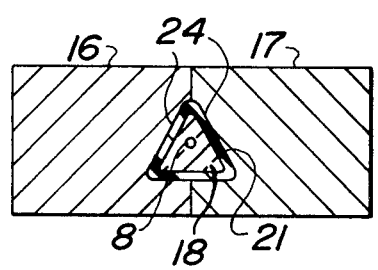
FIG. 8 is a sectional view of the extrusion mold taken along the section line 8—8 of FIG. 7.

FIGS. 7 and 8 provide for another method of providing layer or stem cover 3 on stem portion 5 of improved thermometer 1. The method steps as depicted in FIGS. 7 and 8 relate to an extrusion type of molding process. In this process, rectal thermometer 18 is inserted within two halves of extrusion mold 16 and 17 having provided therein two halves of extrusion cavity mold 24. Rectal thermometer bulb section 19 includes bulb plastic coating 20 which is formed thereon in some like manner to that which has hereinbefore been described. Clear plastic molding material is inserted under pressure through extrusion mold nozzle 23 and fills the clearance between rectal thermometer 18 peripheral boundaries and the internal walls of extrusion cavity 24. Cavity 24 includes a thickened plastic section 22 at the rectal thermometer terminal end to provide for the extended plastic area at the terminal end of rectal thermometer 18.

What is claimed is:

1. A method for enclosing a thermometer having a bulb portion and a graduated stem portion, comprising:
   (a) forming a hardened coating, upon a bulb portion of a thermometer, of a first hardenable material having a substantial thermal conductivity;
   (b) enclosing the stem portion of said thermometer in a substantially transparent second material having a substantially lower thermal conductivity than said first material.

2. The method of claim 1 wherein said first material comprises a hardenable plastics material and a powdered material having a high thermal conductivity.

3. The method of claim 1 wherein said first material includes a silicone rubber having a high thermal conductivity.

4. The method of claim 1 wherein said forming step includes molding said hardenable coating about said bulb portion.

5. The method of producing a thermometer as recited in claim 4 where the step of molding includes the step of inserting said bulb portion of said thermometer into a mold die cavity containing a thermally conductive material in a liquid state.

6. The method of producing a thermometer as recited in claim 5 where the step of inserting is followed by the step of maintaining said bulb portion of said thermometer within said hardenable material for a predetermined time whereby said material is in a hardened state and adheres to said bulb portion.

7. The method of producing a thermometer as recited in claim 6 where the step of maintaining is followed by the step of removing said bulb portion and formed second layer from said mold die cavity.

8. The method of producing a thermometer as recited in claim 4 where the step of molding includes the step of providing a gelatin mold having a predetermined contour cavity.

9. The method of producing a thermometer as recited in claim 8 where the step of providing a gelatin mold is followed by inserting said bulb portion of said thermometer into said thermally conductive hardenable material in a liquid state contained within said cavity.

10. The method of producing a thermometer as recited in claim 9 where the step of inserting is followed by the step of dissolving said gelatin mold subsequent to said hardenable material being in a hardened state.

11. The method of producing a thermometer as recited in claim 1 where the step of enclosing said stem portion includes the step of inserting said stem portion within a tubular heat shrinkable element having a closed end section.

12. The method of producing a thermometer as recited in claim 11 where the step of inserting said stem portion is followed by the step of applying heat to said tubular element for shrinking said tubular element into continuous contact with an outer surface of said stem portion of said thermometer.

13. The method of producing a thermometer as recited in claim 1 where the step of enclosing said stem portion includes the step of coating said stem portion with said substantially transparent second material.

14. The method of claim 13 wherein the stem coating step includes dip-molding said substantially transparent material about said stem.

15. The method of claim 13 wherein coating said stem includes extrusion coating.

* * * * *